May 26, 1970 U. J. BEAS 3,513,799
COVER SYSTEM FOR VESSELS
Filed Dec. 24, 1968 3 Sheets-Sheet 1

INVENTOR.
URBAN J. BEAS
BY
Kenyon & Kenyon
ATTORNEYS

May 26, 1970
U. J. BEAS
3,513,799
COVER SYSTEM FOR VESSELS
Filed Dec. 24, 1968
3 Sheets-Sheet 2
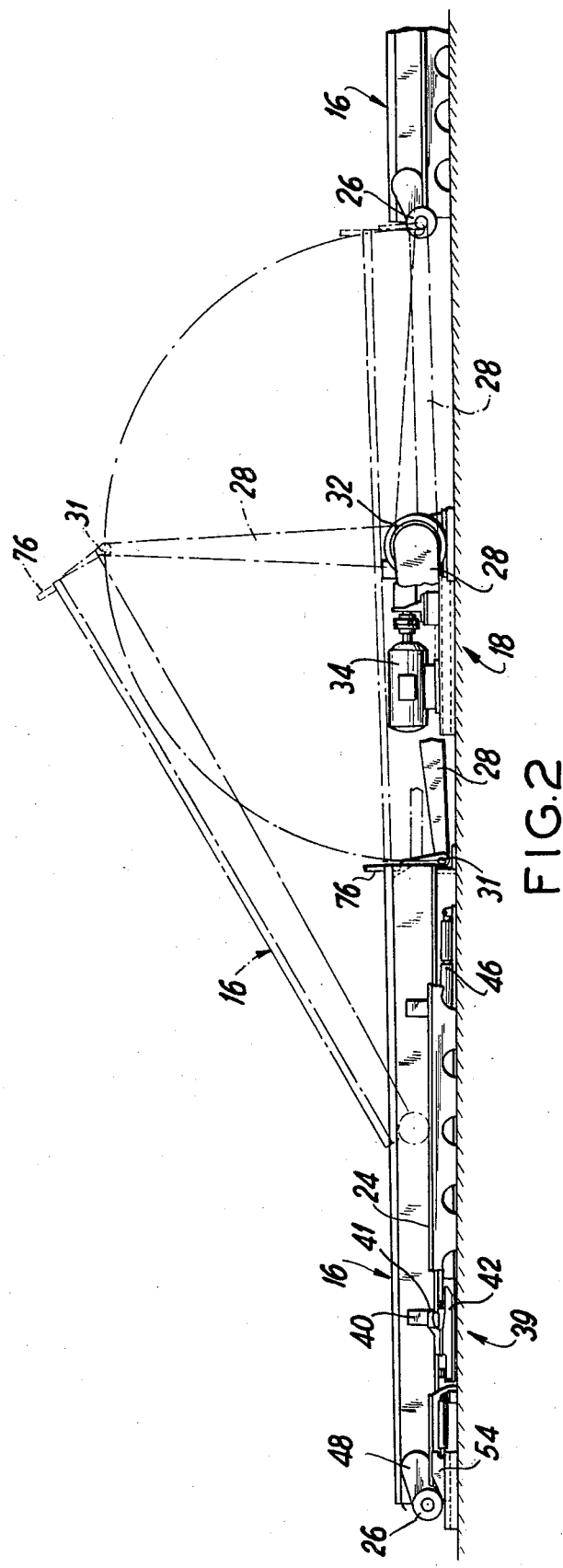
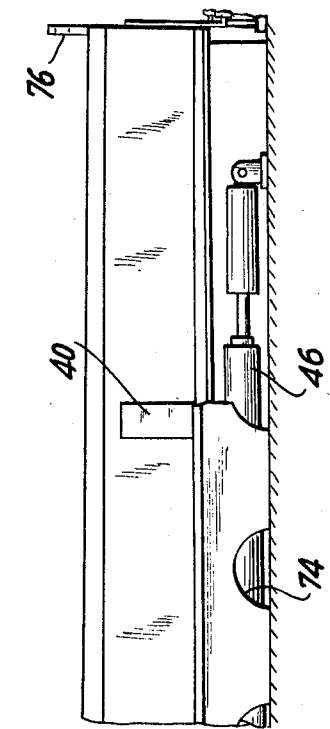
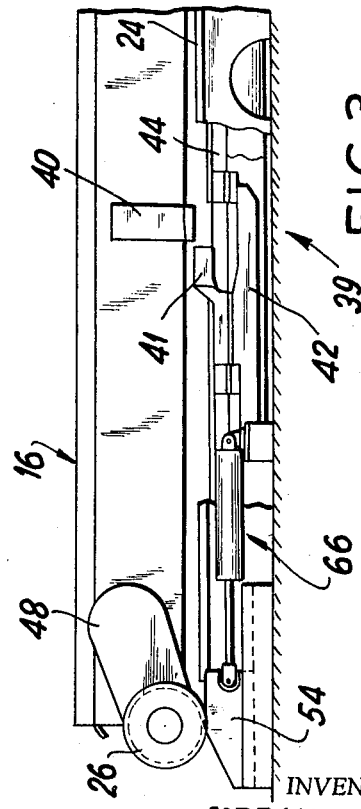
INVENTOR.
URBAN J. BEAS
BY
Kenyon & Kenyon
ATTORNEYS

# United States Patent Office 3,513,799
Patented May 26, 1970

---

3,513,799
COVER SYSTEM FOR VESSELS
Urban J. Beas, Scotch Plains, N.J., assignor to Mac-Gregor-Comarain, Incorporated, New York, N.Y., a corporation of New York
Filed Dec. 24, 1968, Ser. No. 786,724
Int. Cl. B63b *19/18*
U.S. Cl. 114—202                            7 Claims

ABSTRACT OF THE DISCLOSURE

A hatch cover system for vessels such as cargo ships, barges or the like. A single panel hatch cover is provided to cover each hatchway of the vessel. The hatch cover is provided with wheels mounted on its front corners and a linkage system pivotally connected to its rear edge for facilitating the opening and closing thereof. Rails are provided along the sides of the hatchway upon which the wheels ride and a hydraulic actuator is connected to the linkage system automatically open and close the hatch cover. Dogs are provided along the edges of the hatchway and are adapted to mate with dog brackets provided on the hatch cover to clamp the hatch cover in a closed watertight position. The dogs are operated automatically by means of a hydraulic actuator. Hydraulically actuated movable rails are provided at the front of the rails to raise and lower the hatch cover to bring hatch cover wheels in alignment with the rails when the hatch cover is initially open.

---

This invention relates to a hatch cover system for vessels and more particularly to a hatch cover system for vessels which may be automatically operated.

There is a growing need in the transportation of bulk particulate material such as ore, coal or the like to provide water bound vessels which may be loaded and unloaded rapidly. The trend is to provide facilities both on the vessel and at dockside which automatically load and unload a vessel. Heretofore, vessels such as barges or the like which carry bulk material have been provided with hatch covers which have been opened by means of a crane or the like either mounted above the hatch covers on the barge or mounted at the dockside facility. With the increasing demand for vessels carrying larger tonnages of bulk material, it is desirable that the turn-around time for the vessel be kept to a minimum. To this end, it is also desirable that such a vessel be loaded and unloaded in the minimum amount of time. It has been found that loading and unloading may be accelerated by providing hatch cover systems which are self-contained and automatically controlled.

A problem has also arisen during the loading of the bulk material into the vessel due to spillage of the material onto the open hatch cover and the decks of the vessel. This spillage necessitates the use of greater power in closing the hatch cover and also produces undesirable waste of the bulk material. In certain loading systems the height of the hatch covers both in the open and closed positions must be kept to a minimum for proper operation of the system. Thus, in the open position the hatch cover must be stowed substantially flush with the height of the closed hatchways and therebetween. However it is also desirable that spacing between hatchways be kept to a minimum in order to facilitate loading of the vessel.

It is thus an object of the present invention to provide a hatch cover system for vessels which is automatic in operation and simple in use.

It is a further object of the present invention to provide a hatch cover system for vessels wherein spillage and wastage of material during loading is kept to a minimum.

It is another object of the present invention to provide a hatch cover system for vessels wherein a hydraulic control system is provided for opening and closing the hatch covers of the system and for clamping and unclamping the hatch covers in the closed position.

Another object of the present invention is to provide a hatch cover system wherein the hatch cover serves as a protection for the cover actuating mechanism against inadvertent spillage and also serves as collector and chute for the spillage of pellets.

Still another object of the present invention is to permit replacement of the hatch cover without dismantling of the cover actuating system and to permit operation of the hatch cover by outside means if the cover actuating system is rendered inoperative.

In a preferred embodiment of the hatch cover system of the present invention the hatch cover is provided with wheels mounted on the front corners and a linkage assembly pivoted to the rear end thereof. An automatic actuator mechanism, preferably hydraulic, is attached to the linkage system and effects opening and closing of the hatchcover. The hatch cover wheels ride on rails mounted on the vessel deck adjacent the edges of the hatchway. Movable wheel wedges positioned at the front of these rails raise and lower the hatch cover wheels into and out of alignment therewith. Slidable dogs mounted on the deck are adapted to engage dog brackets on the hatch cover to clamp the hatch cover in a watertight closed position. Both the wheel wedges and the dogs are provided with automatically controlled actuator mechanism preferably of the hydraulic type. Chute skirts are provided along the sides and rear end of the hatch cover and the cover has an upper surface which slants toward the front end thereof in order to minimize collection of bulk material inadvertently spilled during loading.

Other objects and advantages will be apparent from the following detailed description and drawings wherein:

FIG. 2 is a side elevational view of the system of FIG. 1;

FIG. 3 is an enlarged side elevational view of the locking and wheel lifting mechanism shown in FIG. 2;

Figure 1:
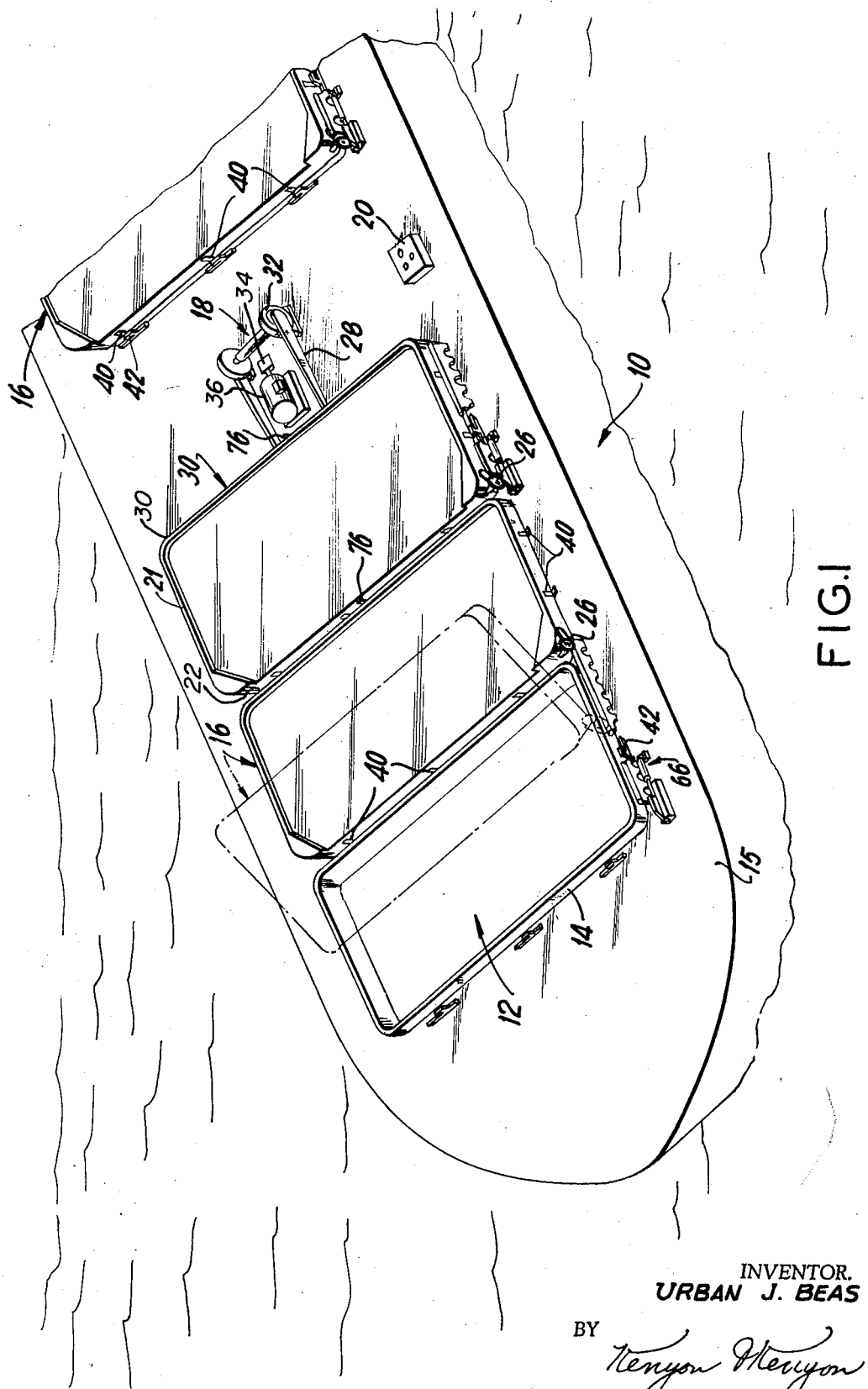
FIG. 1 is a perspective view of a vessel incorporating the hatch cover system of the present invention.

Referring now to the drawings, FIG. 1 shows a perspective view of a vessel such as a barge illustrating in schematic form a preferred embodiment of the hatch cover system of the present invention. As shown, barge 10 is provided with a plurality of openings or hatchways 12. Hatchways 12 permit the loading and unloading of bulk particulate material into barge 10. Hatchways 12 are bounded by coaming 14 which comprises a raised border projecting above deck 15 of vessel 10 to prevent water from projecting above deck 15 of vessel 10 to prevent water from running into the hatchway and down into the hold below. Hatch covers 16 are provided to close and seal hatchways 12 and are dimensioned to completely enclose coaming 14. Drive mechanism 18 (hereinafter to be described in greater detail) is provided to open and close cover 16. A control station 20 is provided for controlling drive mechanism 18 and hatch cover locking and wheel raising mechanisms to be described in greater detail hereinafter.

Cover 16 is provided with chute skirts 21 on the sides and rear end thereof and the upper surface of cover 16 is preferably slanted in order to minimize collection of material inadvertantly spilled during the loading operation.

To facilitate the opening and closing of hatch cover 16, the front end 22 thereof is provided with wheels 26 adapted to roll on rails 24 mounted on deck 15 adjacent the sides of coaming 14. Arm means 28 is pivotally connected to the rear edge 30 of cover 16 by means of pins 31 (FIG. 2).

Drive mechanism 18 preferably comprises an hydraulic actuator 32 an hydraulic pump 34 and electric motor 36. Actuator 32 is connected to arm means 28 and powered by pump 34, through appropriate controls. Pump 34, in turn, is driven by electric motor 36.

Figure 4:
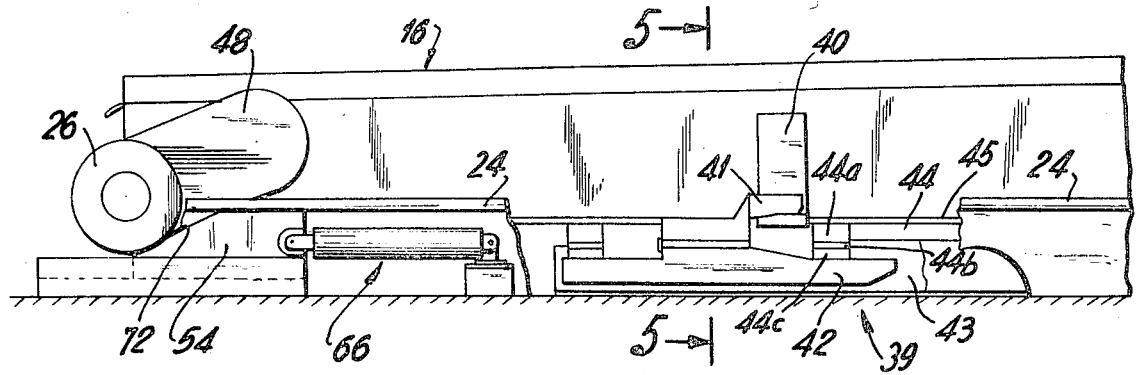
FIG. 4 is a partial side elevational view showing the front end of the hatchcover in the closed and locked position.

Referring now to FIGS. 2–7, there is shown in greater detail drive mechanism 18 and the hatch cover locking and wheel raising mechanisms. Hatch cover locking mechanism 39 comprising lugs or dog brackets 40 mounted on the sides of cover 16, lugs 40 being adapted to engage dog members 41. Dog members 41 are bolted to slides 42 which are connected to tie bar 43 (FIG. 4). Dog bearing pad assemblies 44 are connected to channel 45 in which slides 42 and tie bar 43 slide. Assemblies 44 preferably comprise back-up pad 44a of suitable rigid material such as steel, resilient pad 44b of elastomer material such as rubber, neoprene or the like and bearing pad 44c of suitable bearing material such as bronze. Assemblies 44 engage the upper surface of slide 42 and compensate for bending effects in the hatch cover system encountered when the hatch cover is locked and the vessel is water bound.

Tie bar 43 is actuated by mechanism 46 which is preferably hydraulically actuated and tied in to the hydraulic system of drive mechanism 18.

Mounted at the front end 22 of hatch cover 16 are wheels 26 which are connected to hatch cover 16 by means of brackets 48. Wheels 26 comprise a grooved portion 50 adapted to ride on rails 24. Wheels 26 are further provided with shoulders 52 adapted to engage extensible wheel wedges 54. Wedges 54 are positioned at the ends of rails 24 and are adapted to lift wheels 26 to align them with rails 24.

As shown in FIG. 4, hatch cover 16 is in the closed watertight position. In this position, members 41 engage lugs 40 and wedges 54 are withdrawn. Wheels 26 are disposed vertically below the level of rails 24 and hatch cover 16 seals hatchway 12 by means of engagement with coaming 14.

Figure 5:
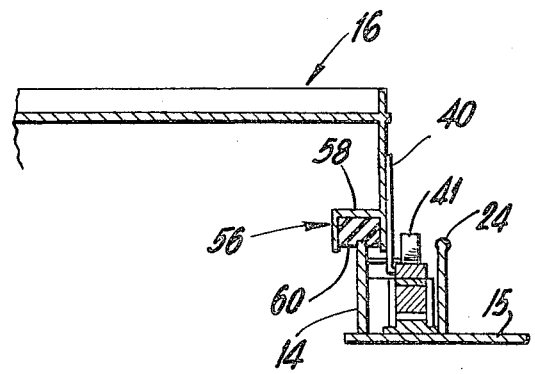
FIG. 5 is a partially sectional front elevational view taken along line 5—5 of FIG. 4.
Figure 7:
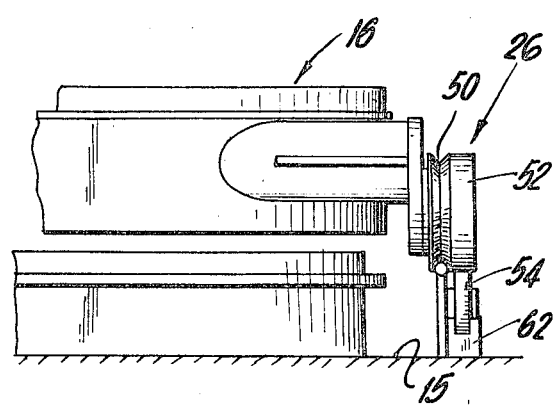
FIG. 7 is a partial front elevational view taken along line 7—7 of FIG. 6.

This is more clearly shown in FIG. 5, wherein edge 56 of hatch cover 16 comprises a channel member 58 provided with a sealing member 60 of resilient material such as rubber or the like. In the closed position, coaming 14 bears against material 60 to provide a watertight seal.

Figure 6:
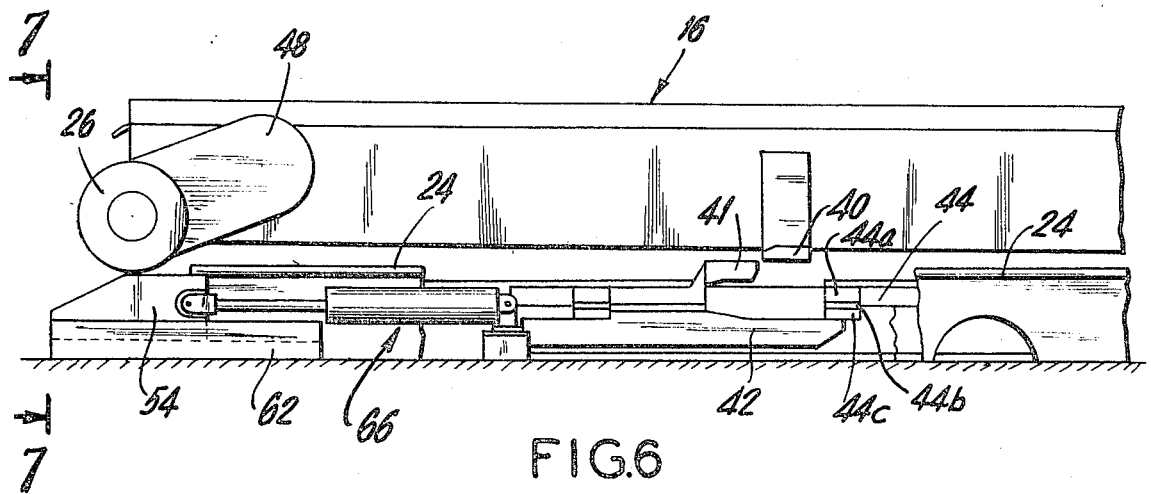
FIG. 6 is a partial side elevational view showing the front end of the hatch cover in the initially open position.

Wedge 54 is adapted to slide within guide means 62 mounted on deck 15 of vessel 10. Actuator 66 is connected to wedge 54 and reciprocates wedge 54 between a retracted position, as shown in FIG. 4, and an extended position, as shown in FIG. 6.

Apertures 74 (FIGS. 2 and 3) are provided in rails 24 to permit drainage of water which may seep between them and coaming 14.

The operation of the hatch cover system as described hereinabove is as follows: During transit hatch covers 16 are in the closed watertight position with members 41 engaging lugs 40 and wedges 54 are in the retracted position. To open covers 16 mechanisms 46 are actuated to disengage members 41 from lugs 40. Mechanisms 66 are then actuated to extend wedges 54 and thereby raise wheels 26 to alignment with rails 24.

Lifting of covers 16 is accomplished by the actuation of mechanism 18 thereby causing linkage 28 to pivot substantially 180° from the position shown at the left of FIG. 2 to the position shown in dashed lines at the right of FIG. 2. This substantially 180° pivoting is accomplished by locating the pivot point of linkage 28 at a distance equal to approximately one half the length of cover 16. As the rear end of cover 16 is rotated the front end 22 rolls on rails 24 and cover 16 is stowed between hatchways to permit loading of the vessel through the opened hatchway.

Due to the slant of the upper surface of cover 16, particulate material which is inadvertantly spilled on cover 16 will tend to roll down into hatchway 12 thereby preventing undesirable buildups of material. This reduction of material buildup reduces the power necessary to close hatch cover 16 since less weight must be lifted.

Actuator mechanism 18 is also shielded from undesirable spillage that may damage it since cover 16 lies over the mechanism when in the stowed open position.

To close cover 16, mechanism 18 is actuated to pivot linkage 28 and thereby to lift rear end 30 back through the substantially 180° arc. During this operation cover 16 is tilted towards the front and any material which has accumulated on the cover will be caused to slide into the hatchway. Wheels 26 roll on rails 24 to carry the front end back to its closed position. Mechanisms 66 are then actuated to retract wedges 54 and thereby drop wheels 26 below the level of rails 24 and also bring members 41 into alignment with lugs 40. Mechanisms 46 are then actuated to cause members 41 to engage lugs 40 thereby clamping the hatch cover in its watertight position.

Rails 26 are preferably rounded in order to prevent accumulation of material on them thereby reducing the likelihood of derailing wheels 26.

A lug 76 is also provided at the rear of cover 16 to permit operation of the hatch cover if its actuating mechanisms are rendered inoperative for any reason. In such an emergency situation an outside crane may be hooked to the lug to lift the cover's rear end.

Since the rear end of cover 16 is connected to its actuating mechanism 18 through pins 31 connected to linkage 28, in case of damage, the cover can be easily removed from the vessel for repair without dismantling the actuating system by merely removing these pins.

It will be appreciated that although the actuating mechanisms are preferably hydraulic that any suitable drive mechanism may be used which is actuated other than hydraulically. Thus for example electrically actuated mechanisms may be used to actuate the wheel lifting and cover locking systems and a suitable electric motor could be used to rotate linkage 28.

Although not shown it is intended that lugs and dog members be provided on all four sides of the hatch cover in order to ensure proper sealing thereof.

What is claimed is:

1. In a vessel having a deck, at least one hatchway and rails mounted on said deck adjacent said hatchway; a hatch cover system comprising a hatch cover for covering said hatchway, said hatch cover including wheels having shoulder portions mounted at one end thereof for riding on said rails, a linkage pivotally connected to an opposite end of said hatch cover, an actuator mounted on said deck and pivotally mounting said linkage thereon at a distance from the opposite end of the hatch cover when said hatch cover is covering said hatchway equal to approximately one-half the length of said hatch cover between said ends, means connected to said actuator for actuating said actuator to pivot said linkage through substantially a 180° arc whereby said hatch cover is moved between a position covering over said hatchway and a position covering over said linkage and said actuator, and wheel raising and lowering means mounted on said deck to the front of said rails to raise and lower said wheels on said hatch cover into and out of alignment with said rails, said wheel raising and lowering means including wheel wedges slidably mounted on said deck to engage said shoulder portions, said wheel wedges having a portion projecting in front of said rails and wedge actuating means for moving said wedges alternatively between a first position wherein said wheels are in a raised position in alignment with said rails and a second position wherein said wheels are in a lowered position below the level of said rails.

2. In a vessel as set forth in claim 1 wherein said linkage is removably connected to said hatch cover whereby said hatch cover can be disconnected from said linkage for removal therefrom.

3. In a vessel as set forth in claim 1 wherein said wheels have a circumferential groove and wherein said rails have rounded upper surfaces for engaging said grooves of said rails.

4. In a vessel as set forth in claim 1 further including a hatch cover locking means comprising a plurality of lugs mounted on the sides and ends of said hatch cover, a plurality of movable dog members mounted on said deck adjacent said lugs and being adapted to engage said lugs and dog member actuating means for moving said dog members into and out of engagement with said lugs.

5. In a vessel as set forth in claim 1, a plurality of dog bracket bearing assemblies mounted on the sides of said hatchways and adapted to engage said dog members, at least a portion of said bearing assemblies being of resilient elastomeric material.

6. In a vessel as set forth in claim 1 wherein said rails are apertured to permit water drainage.

7. In a vessel having a deck and at least one hatchway; a hatch cover system comprising a hatch cover having an upper surface slanted toward one end and skirts on said one end and said sides of said hatch cover for covering said hatchway, a linkage pivotally connected to the other end of said hatch cover, a hatch cover actuating mechanism connected to said linkage and adapted to rotate said linkage through a substantially 180° arc to open and close said hatch cover, said hatch cover actuating mechanism being mounted on said deck at a distance from the end of said hatchway such that rotation of said linkage through substantially an 180° arc will move said hatch cover from a position in which the hatch cover completely encloses said hatchway to a position in which the hatch cover is substantially completely clear of said hatchway, rails mounted on said deck on either side of said hatchway and adjacent thereto, and wheels mounted on said one end of said hatch cover at the corners thereof, said wheels being adapted to ride on said rails when said hatch cover is opened and closed.

References Cited

UNITED STATES PATENTS

| | | | |
|---|---|---|---|
| 963,854 | 7/1910 | Bieber | 49—250 |
| 2,105,873 | 1/1938 | Weinheimer | 49—250 |
| 2,707,928 | 5/1955 | Farrell | 114—202 |
| 3,145,664 | 8/1964 | Dorey | 49—208 XR |
| 3,190,637 | 6/1965 | Kummerman | 114—202 |
| 3,194,178 | 7/1965 | Weston | 238—122 XR |

ANDREW H. FARRELL, Primary Examiner

U.S. Cl. X.R.

49—250